UNITED STATES PATENT OFFICE.

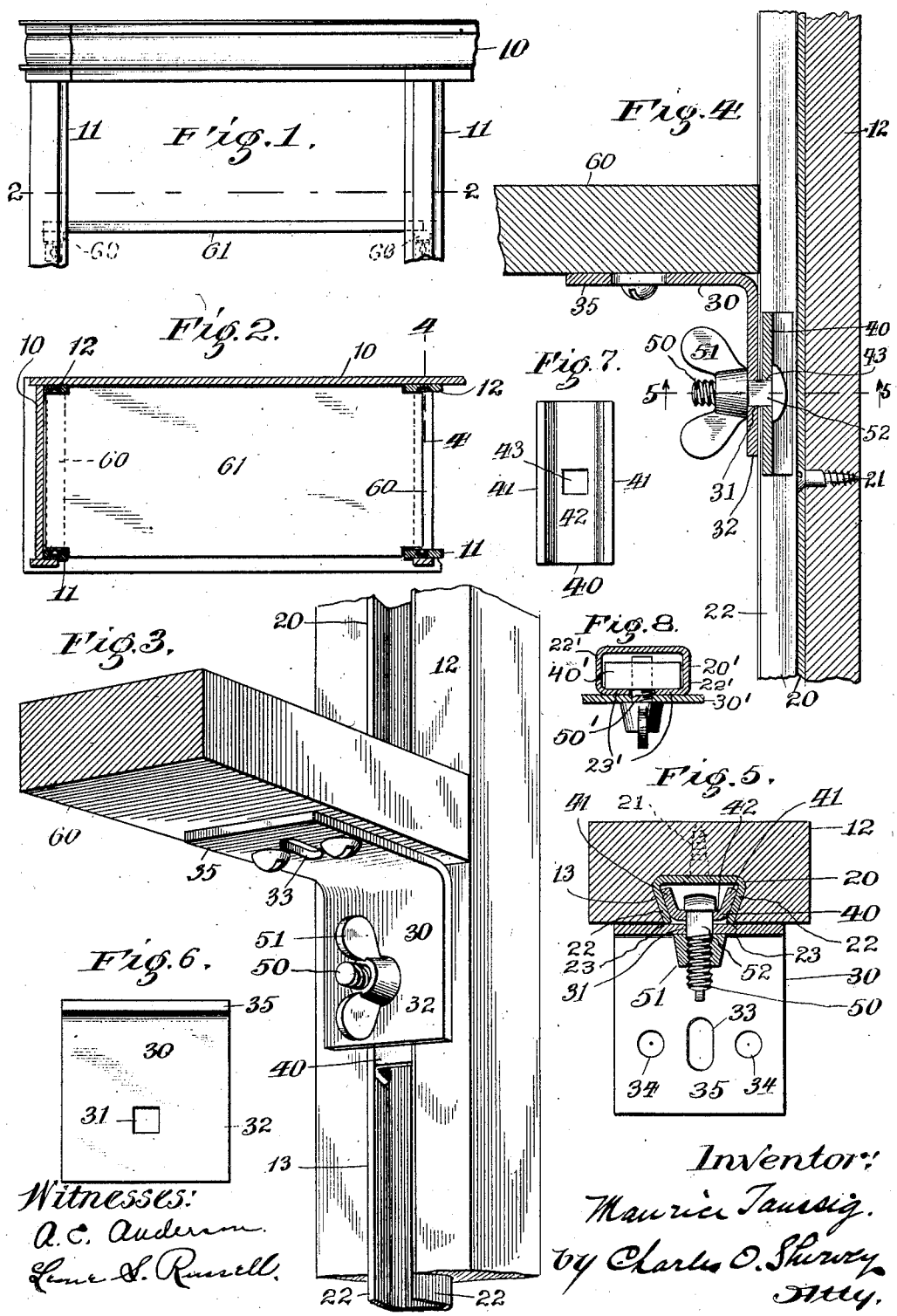

MAURICE TAUSSIG, OF CHICAGO, ILLINOIS.

ADJUSTABLE SUPPORT FOR SHELVING.

No. 866,695.  Specification of Letters Patent.  Patented Sept. 24, 1907.

Application filed July 13, 1906. Serial No. 326,127.

*To all whom it may concern:*

Be it known that I, MAURICE TAUSSIG, a resident of the city of Chicago, in the county of Cook and State of Illinois, have invented certain new and useful Improvements in Adjustable Supports for Shelving, of which the following is a full, clear, and exact description.

My invention relates to certain new and useful improvements in adjustable shelving and particularly to the mechanism which connects the shelves with the upright members of the shelving.

The object of my invention is to produce a simple and effective device by which the shelves may be supported upon the upright members or pilasters at any point along the same so as to be capable of vertical adjustment thereon.

Another object is to so construct the engagement devices that the shelf bracket will be held by frictional contact alone, which frictional contact may be effected by the mere turning of a wing nut by the hand.

To such end the invention consists in certain novel features of construction, a description of which will be found in the following specification and the essential features more definitely pointed out in the claims.

The invention is clearly illustrated in the drawing accompanying this specification, in which Figure 1 is a front view of a fragment of shelving embodying the preferred form of my invention. Fig. 2 is a horizontal section taken in the line 2—2 of Fig. 1. Fig. 3 is a detail perspective view of a bracket and the parts adjacent thereto. Fig. 4 is a vertical section taken in the line 4—4 of Fig. 2. Fig. 5 is a horizontal section taken in the line 5—5 of Fig. 4. Fig. 6 is a front view of the bracket alone. Fig. 7 is a rear view of the friction clamping shoe and Fig. 8 is a horizontal section of a slightly modified form.

In these views 10 represents the casing of a set of shelving, and 11—12 the pilasters at the front and rear thereof which support the shelves. These pilasters are formed with longitudinally extending grooves 13 throughout their length, the sides of the grooves converging toward each other from the base of the groove—so as to overhang the opening and form the ordinary dovetail groove. The pilasters are arranged in pairs, one of the members of which is at the front and one at the rear of the casing and the dovetail groove in the two pilasters of each pair face each other.

A channel iron 20 is placed in each of the dovetail grooves 13 and secured in place by screws 21. The rear or base of said channel iron is flat and the sides 22 converge toward each other, making the channel iron in the form of a dovetail reinforcement for the groove. The edges 23 of the channel irons lie approximately flush with the faces of the pilasters and in the use of the device impinge upon the shelf supporting brackets 30. The brackets 30 are preferably in the form of angle irons, preferably somewhat narrower than the pilasters and formed with square openings 31 in their vertical flanges 32, and with perforations 33 and 34 in their horizontal flanges 35. Each bracket connects with a friction clamping shoe 40, which is confined in the channel iron 20 and bears upon the inner side faces thereof. Said shoes are preferably channel shaped, the sides 41 of which diverge from the base 42 in the same general direction as the sides of the channel iron 20 converge from their bases, so that the meeting faces of the channel irons and shoes will lie in close contact with each other when brought together. Each friction shoe is formed with a square perforation 43, through which passes a bolt 50, upon the end of which is threaded a wing nut 51 adapted to be screwed upon the bolt to crowd the vertical flange of the bracket upon the sharp edges 23 of the channel iron 20. The bolt 50 is formed with a square portion 52 which fits in the square perforations 43 and 31 in the shoe and bracket respectively and acts to prevent accidental rotation of the bracket upon the bolt.

Cross bars 60 extend between each pair of pilasters and are secured upon the brackets 30 by means of screws which pass through the perforations 33 or 34 in the horizontal flanges of the brackets, and the shelf proper, 61, rests upon the cross bars 60. To raise or lower the shelf, the wing nuts on the four brackets of the shelf are unscrewed sufficiently to remove the friction, whereupon the shelf may be adjusted to the position desired and the wing nuts again tightened.

One of the particular points of advantage of this construction consists in the fact that when the nuts are tightened up and the friction applied, there is no strain upon the screws 21, and consequently no tendency to loosen the channel irons from their supports. Furthermore, the friction is applied to the inclined faces of the channel irons by the wedge-like action of the friction-shoes, and the sharp edges 23 of the channel iron biting into the bracket prevents the spreading of the channel iron. Yet on account of the inclined friction surfaces the friction can be applied by the mere turning of the wing nuts by hand. In Fig. 8 the sides 22' of the channel iron 20' are bent to form clamping-sides 23' which are adapted to lie between the angle bracket 30' and the clamping shoe 40'; the latter in this case being in the form of a block through which the clamping screw 50' extends.

I am aware that various other alterations and modifications of this construction are possible and I do not therefore desire to limit myself to the exact construction shown and described.

I claim as new and desire to secure by Letters Patent:

1. In a device of the class described, the combination with a suitable supporting member having an overhung groove in one of its faces, of a friction shoe slidable in said groove, and having bearing faces which engage the overhung walls of the groove to prevent rotation of the shoe, a shelf bracket bearing upon the supporting member, and a bolt and nut connecting the shoe and bracket, and arranged to draw them together to clamp the bracket upon the supporting member, said bolt containing one or more flat faces engaging one or more corresponding faces upon the shoe and bracket.

2. In a device of the class described, the combination with a suitable supporting member having an overhung groove in one of its faces, of a friction shoe slidable in said groove and having bearing faces which engage the overhung walls of the groove to prevent rotation of the shoe, a shelf bracket bearing upon the supporting member, a bolt having a head bearing upon the shoe and a squared portion extending through squared holes in the shoe and bracket, and a nut threaded upon the bolt and bearing upon the bracket.

3. In a device of the class described, the combination with a pilaster having a dovetail groove in one of its faces, of a channel iron seated in said groove and forming a lining for said groove with two of its edges projecting beyond the face of the pilaster, a shelf supporting bracket bearing upon the projecting edges of said channel iron, a friction shoe slidable in said channel iron and bearing upon the inner faces of the channel iron, and a bolt and nut connection between the shoe and bracket.

In witness whereof I have signed the above application for Letters Patent at Chicago in the county of Cook and State of Illinois, this 6 day of July, A. D. 1906.

MAURICE TAUSSIG.

Witnesses:
E. J. MASSMANN,
CHARLES O. SHERVEY.